United States Patent

Kan et al.

[11] Patent Number: 5,168,205
[45] Date of Patent: Dec. 1, 1992

[54] METHOD AND APPARATUS FOR CHARGING A BATTERY IN HIGH AMP AND AUTOMATIC CHARGING MODES

[75] Inventors: John T. C. Kan; John F. Kan, both of Chicago, Ill.; Joseph P. Habermann, Hartland, Wis.

[73] Assignee: Hein-Werner Corporation, Waukesha, Wis.

[21] Appl. No.: 508,345

[22] Filed: Apr. 4, 1990

[51] Int. Cl.⁵ ............................................. H02J 7/00
[52] U.S. Cl. ..................................... 320/22; 320/23; 320/24; 320/31; 320/37; 320/38; 320/39; 320/40
[58] Field of Search ................................. 320/22-24, 320/31, 37, 38, 39, 40

[56] References Cited

U.S. PATENT DOCUMENTS

| | | | |
|---|---|---|---|
| 3,678,363 | 7/1972 | Ringle | 320/24 |
| 3,688,177 | 8/1972 | Reeves et al. | 320/24 |
| 3,699,422 | 10/1972 | Miller et al. | 320/23 |
| 4,270,080 | 5/1981 | Kostecki | 320/24 |
| 4,341,988 | 7/1982 | Small | 320/31 |
| 4,392,101 | 7/1983 | Saar et al. | 320/39 |
| 4,583,035 | 4/1986 | Sloan | 320/22 |
| 4,742,290 | 5/1988 | Sutphin et al. | 320/21 |
| 5,055,763 | 10/1991 | Johnson et al. | 320/15 |

FOREIGN PATENT DOCUMENTS

| | | | |
|---|---|---|---|
| 1816562 | 6/1970 | Fed. Rep. of Germany | 320/39 |
| 0892954 | 4/1962 | United Kingdom | 320/39 |
| 1309394 | 3/1973 | United Kingdom | 320/40 |
| 2028029 | 2/1980 | United Kingdom | 320/24 |
| 2080642 | 2/1982 | United Kingdom | 320/24 |

OTHER PUBLICATIONS

Marquette Charger Model Nos. 32-145, 32-155 and 32-140.

Primary Examiner—Steven L. Stephan
Assistant Examiner—Thomas M. Dougherty
Attorney, Agent, or Firm—Michael, Best & Friedrich

[57] ABSTRACT

A battery charger adapted to be electrically connected to the terminals of a battery for providing a charge to the battery, the battery charger comprising a device for supplying charging current to the battery, the current supplying device being operable to alternatively and selectively supply current at a first and second rate, the first rate providing for high rate charging of the battery, circuitry for sensing the voltage of the battery while the charger is connected to the battery, the sensing circuitry being adapted to be coupled to the battery, circuitry for alternatively selecting the first rate and the second rate, the selecting circuitry being coupled to the supplying circuitry and to the severing circuitry, circuitry for severing the supply of charging current to the battery when the second rate is selected, and when the sensing circuitry senses battery voltage in excess of a first predetermined threshold voltage, and for resuming the supply of current to the battery at the second rate when the sensing circuitry senses battery voltage below a second predetermined threshold voltage lower than the first predetermined threshold voltage, the severing circuitry being coupled to the current supplying device and to the sensing circuitry.

50 Claims, 2 Drawing Sheets

METHOD AND APPARATUS FOR CHARGING A BATTERY IN HIGH AMP AND AUTOMATIC CHARGING MODES

FIELD OF THE INVENTION

This invention relates to battery chargers and more particularly to automotive battery chargers and the like including means for sensing the state of charge of a battery and interrupting the charging cycle when the battery has been fully charged.

BACKGROUND OF THE INVENTION

Some battery chargers used in applications such as in charging automotive batteries and the like include means for supplying a high charging current to the battery, for example, 40 amps to provide for rapid charging of the battery. They may include means for reducing the charge being supplied to the battery once the voltage of the battery has reached a predetermined voltage. For example, in a conventional 12 volt automatic battery charger, the charge is reduced to 0.1 amps or less once the voltage of the battery reaches approximately 14.4 volts. The reduced charge of 0.1 amps or less is then continuously supplied to the battery to maintain the charge on the battery. In operation of these battery chargers, if the battery charger continues to supply a low current charge to the battery for extended periods of time, the water in the battery will be converted to hydrogen and oxygen which is dissipated from the battery causing damage to the battery. In addition, if the battery charger continues to supply a low current charge to the battery for extended periods of time, the grids of the battery being charged will corrode at an accelerated pace, thereby causing the battery to fail prematurely. On the other hand, if the battery is left uncharged for a long period of time, self discharge of the battery will cause the active material of the battery to sulfate, thus also causing irreversible damage to the battery.

Some battery chargers of the type including means for sensing the state of charge of a battery and interrupting the charging cycle when the battery has been fully charged further include means for continuing to monitor the state of charge of the battery and for automatically restarting the supply of charging current to the battery when the battery's state of charge is below full charge.

Another type of battery charger supplies only relatively small charges to a battery, for example a charge at the rate of 10 amps, and includes means for sensing the charge of the battery and means for shutting off the charging current to the battery once the voltage of the battery reaches a predetermined voltage, for example 14.4 volts. The battery charger will then continue to sense the charge of the battery and if that voltage falls below a predetermined voltage, the charger will once again supply a charging current to the battery until the voltage of the battery is raised to 14.4 volts, and is again interrupted.

In other battery chargers, means are provided for supplying a charge to the battery at a relatively high rate of charge, such as at approximately 40 amps, or alternatively at a lower rate such as at 10 to 15 amps. These battery chargers commonly include a switch or control permitting the operator to select the operating mode of the battery charger such that it operates at either a high current rate or at a lower current of approximately 10 to 15 amps.

Other battery chargers have included means for charging the battery at a high rate of charge and alternative means for charging the battery at a lower rate, and further including means for timing the selected rate of charge. In these chargers the battery is then charged at the selected rate of charge until the timer turns off the charger.

SUMMARY OF THE INVENTION

The present invention provides an improved battery charger including means for alternatively supplying current to a battery at a relatively high rate of charge, i.e. at a high current, to provide for rapid charging of the battery, and at a lower rate of charge, i.e. at a lower current, the charger including means for sensing the relative charge of the battery and means for switching off or severing the current to the battery whenever the battery is being charged at the second rate and the sensed charge of the battery exceeds a first predetermined threshold voltage. The means for sensing also continues to monitor or sense the charge on the battery and causes a charging current to be supplied to the battery in the event that the charge of the battery falls below a second predetermined threshold voltage, i.e. slightly below a full state of charge.

In another aspect of the invention, a timer means is provided for causing the means for charging at the high rate of charge to operate for a predetermined time period, and for thereafter causing the means for charging at the lower rate (automatic current on/off) to operate.

In another aspect of the invention, means are provided for adjusting the first predetermined threshold voltage (at which threshold the current to the battery is switched off), the adjusting means comprising a continuously variable selector.

In another aspect of the invention, means are provided for adjusting the second predetermined threshold voltage (at which threshold the current to the battery is switched on). The means for adjusting the second predetermined threshold voltage comprises a continuously variable selector in one aspect of the invention.

In another aspect of the invention, the battery charger includes first, second, and third discrete visual indicators, means for illuminating the first indicator in response to the battery charger being connected to a source of alternating current, means for illuminating the second indicator while the current supplying means supplies charging current to the battery at the second current rate, and means for illuminating the third indicator in response to the severing means severing the supply of charging current to the battery while the second (i.e. automatic) charging rate has been selected. The third indicator, when illuminated by the third mentioned illuminating means, thereby provides a visual indication that the second charging rate (i.e. automatic mode) has been selected, and that the current supplying means will resume the supply of charging current to the battery when the sensing means senses battery voltage below the second predetermined voltage.

In another aspect of the invention, the current supplying means comprises a transformer having a primary winding adapted to be electrically connected to a source of alternating current, and a secondary winding adapted to be electrically connected to the battery, and the severing means includes relay contacts operative to open to interrupt current flow through the primary winding of the transformer to sever the supply of charging current to the battery when the sensing means senses battery voltage in excess of the upper predetermined threshold voltage.

One aspect of the invention provides a method of charging a battery comprising the steps of providing means for supplying charging current to the battery, the current supplying means being operable to alternatively supply current at a first rate and at a second rate, selecting one of the first rate and the second rate, electronically severing the supply at charging current to the battery when the second rate is selected and when the battery voltage exceeds a first predetermined threshold voltage, and electronically resuming the supply of current to the battery at the second rate when the battery voltage falls below a second predetermined threshold voltage lower than the first predetermined threshold voltage.

Another aspect of the invention provides a method of charging a battery comprising the steps of providing means for supplying charging current to the battery, the current supplying means being operable to selectively supply current at a first rate of at least 30 amps and at a second rate, selecting the first rate for a selected period of time and thereafter selecting the second rate, electronically severing the supply of charging current to the battery when the second rate is selected and when the battery voltage exceeds a first predetermined threshold voltage, and electronically resuming the supply of current to the battery at the second rate when the battery voltage falls below a second predetermined threshold voltage lower than the first predetermined threshold voltage.

A further aspect of the invention provides a method of charging a battery comprising the steps of providing means for supplying at least 14 amps of charging current to the battery, electronically severing the supply of charging current to the battery when the battery voltage exceeds a first predetermined threshold voltage, and electronically resuming the supply of current to the battery when the battery voltage falls below a second predetermined threshold voltage lower than the first predetermined threshold voltage.

These and other features and advantages of the invention will become apparent to those of ordinary skill in the art upon review of the following detailed description of the preferred embodiment of the invention, which is given by way of example, reference being made to the appended drawings.

Figure 1:
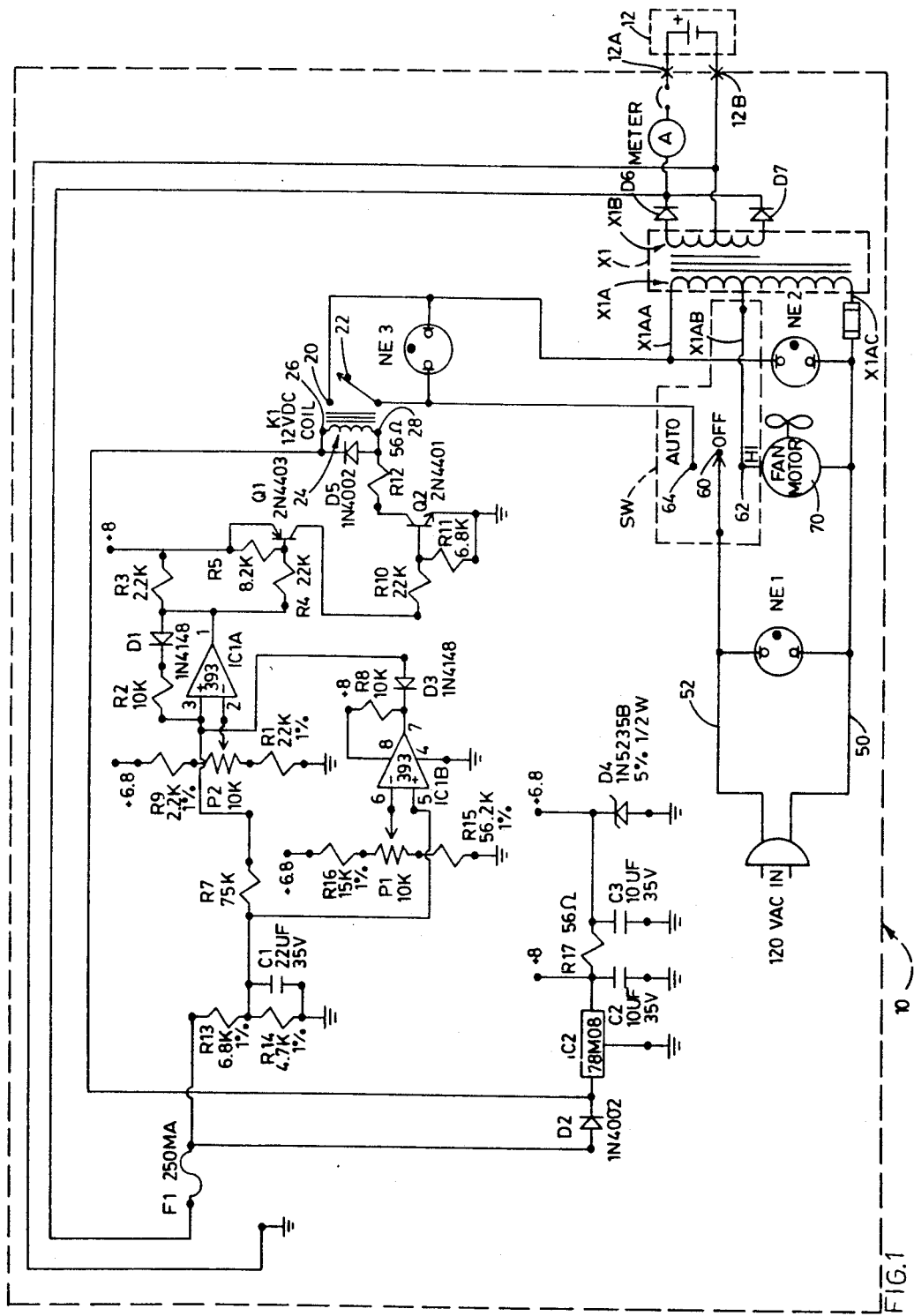
FIG. 1 shows a circuit schematic of a battery charger embodying a first embodiment of the invention.

Before these embodiments of the invention are explained in detail, it is to be understood that the invention is not limited in its application to the details of construction, arrangement of components, and component values set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DETAILED DESCRIPTION OF THE PREFERRED EMBODIMENT OF THE INVENTION

Shown in FIG. 1 is a circuit schematic of a battery charger 10 embodying the invention. The charger 10 of the illustrated embodiment is adapted to be used with a standard twelve volt automotive battery 12 having a positive terminal 12A and a negative terminal 12B.

The battery charger 10 includes means for sensing the voltage of the battery 12 when the battery 12 is electrically connected to the charger 10. In the preferred embodiment, the sensing means comprises a first and second voltage comparator IC1A and IC1B. The comparator IC1A is used to determine if the sensed battery voltage is in excess of a first predetermined threshold voltage, and the comparator IC1B is used to determine if the sensed battery voltage is below a second predetermined threshold voltage. Although the comparators IC1A and IC1B of the illustrated embodiment are part of a dual comparator package, discrete comparator packages could be used.

The battery charger 10 further includes a voltage divider comprising resistors R13 and R14. The voltage across the battery 12 (i.e. across the positive and negative terminals 12A and 12B, respectively, of the battery) is applied, via a fuse F1 (included in the charger 10), to the voltage divider comprising R13 and R14. The charger 10 further includes an electrolytic capacitor C1 in parallel connection with the resistor R14, the parallel combination of R14 and C1 being connected between R13 and the negative terminal 12B of the battery 12. The voltage that appears across the capacitor C1, using the illustrated component values, is 41% of the battery voltage and is applied to the non-inverting input, pin 3, of comparator IC1A, through a resistor R7 (that is included in the charger 10). The voltage that appears across the capacitor C1 is also applied directly to the non-inverting input, pin 5, of the comparator IC1B. The positive supply terminal, pin 8, of the comparators IC1A and IC1B is connected to a positive supply voltage, which is preferably a regulated voltage. The negative supply terminal, pin 4, of the comparators IC1A and IC1B is connected to ground, in the illustrated embodiment. The output, pin 7, of the comparator IC1B is connected to the non-inverting input, pin 3, of the comparator IC1A via a switching diode D3 included in the charger 10. More particularly, the anode of the diode D3 is connected to the non-inverting input, pin 3, of the comparator IC1A, and the cathode of the diode D3 is connected to the output, pin 7, of the comparator IC1B.

The battery charger 10 further includes a diode D1 having an anode connected to the output, pin 1, of the comparator IC1A. The charger 10 further includes a resistor R2 connected between the cathode of the diode D1 and the non-inverting input pin 3, of the comparator IC1A.

The sensing means further includes means for adjusting the first threshold voltage, the adjusting means comprising a continuously variable selector. In the illustrated embodiment, the means for adjusting the first threshold voltage comprises a potentiometer P2 variable at the inverting input, pin 2, of comparator IC1A and having one end connected to a reference voltage via a resistor R9, and another end connected to ground via a resistor R1, the resistors R1 and R9 being included in the sensing means. Preferably, the first reference voltage is a regulated voltage, and when the illustrated component values are used, is regulated to be 6.8 volts.

The sensing means further comprises means for adjusting the second predetermined threshold voltage. More particularly, the means for adjusting the second predetermined threshold voltage comprises a continuously variable selector. More particularly, the means for adjusting the second predetermined threshold voltage comprises a potentiometer P1 variable at the inverting input, pin 6, of the comparator IC1B and having one end connected to a second reference voltage via a resistor R16, and another end connected to ground via a resistor R15, the resistors R16 and R15 being included in the sensing means. Preferably, the second reference voltage is a regulated voltage, and, in the illustrated embodiment, the second reference voltage is the same as the first reference voltage.

Thus, the first and second predetermined threshold voltages, which are used to determine when the charger 10 should stop and start charging, as will be outlined below, can be adjusted in view of battery type or temperature (a battery voltage that represents a fully charged battery at one temperature does not necessarily represent a fully charged battery at another temperature). In one embodiment of the invention, the potentiometers P1 and P2 are accessible to the user of the charger 10. In another embodiment, P1 and P2 are adjustable by the manufacturer of the charger 10 (for use of the charger 10 with a specific type of battery, for example). Using the illustrated component values, the first predetermined threshold is adjustable between 13.6 and 16.2 VDC, and the second predetermined threshold is adjustable between 13.6 and 12.1 VDC.

The battery charger 10 further includes means for regulating voltage so that the first and second predetermined threshold voltages do not change. The illustrated voltage regulating means includes voltage regulator IC2, which provides +8 volts (DC) in the illustrated embodiment, connected to the battery, and a zener diode D4 that is fed by the voltage regulator IC2 through a resistor R17 that is also included in the regulating means. In the illustrated embodiment, the diode D4 is a 6.8 volt zener diode. The 8 volts set by the voltage regulator IC2 supplies the comparators IC1A and IC1B at pin 8, while the 6.8 volts set by the zener diode D4 is used as the first and second reference voltage with the potentiometers P1 and P2. The first and second predetermined threshold voltages are thus kept stable over a range of variations of loads on the charger 10 and temperatures.

The voltage regulating means further includes a silicon rectifying blocking diode D2 supplying current to the voltage regulator IC2 from the positive terminal 12A of the battery 12 via the fuse F1. The diode D2 prevents the charger 10 from attempting to charge the battery 12 if the battery is connected backwards and the battery voltage polarity is reversed. The voltage regulating means further includes a capacitor C2 connected between one end of the resistor R17 and ground, and a capacitor C3 connected between the other end of the resistor R17 and ground, the capacitor C3 being provided to filter out potential electrical noises.

The battery charger 10 includes means for supplying charging current to the battery, the current supplying means being operable to alternatively supply current at a first and second rate, the first rate providing for high rate charging of the battery, i.e., at least 30, and preferably 40, charging amps - charging amps being defined as amps supplied to the battery while the battery is being charged as opposed to being boosted, and the second rate being at least 14, and preferably 15, charging amps.

In the illustrated embodiment, the current supplying means comprises a transformer X1, such as transformer having a primary winding X1A having a first end X1AA, a second end X1AC, and a tap X1AB between the first end X1AA and the second end X1AC, and adapted to be electrically connected to household alternating current (e.g. 120 VAC), and a secondary winding X1B adapted to be electrically connected to the battery 12. In the illustrated embodiment, the ratio of the number of turns between the tap X1AB and the second end X1AC to the number of turns of the portion of the secondary winding X1B that can supply current to the battery 12 at any one time (i.e. between the centertap of the secondary winding X1B and the anode of one of the diodes D6 or D7) is 7.88:1, and the ratio of the number of turns of the entire primary winding X1A to the portion of the secondary winding X1B that can supply current to the battery 12 at any one time (i.e. between the centertap of the secondary winding X1B and the anode of one of the diodes D6 or D7) is 9.41:1. The charger 10 includes diodes D6 and D7 having anodes respectively connected to opposite ends of the secondary winding X1B. The diodes D6 and D7 have cathodes that are adapted to be connected to the positive terminal 12A of the battery 12 to supply positive current to the positive terminal 12A. The secondary winding X1B includes a centertap connected to the negative terminal 12B of the battery to supply negative current to the negative terminal 12B. The charger 10 optionally, but preferably, further includes an ammeter A connected to the secondary winding X1B for series connection with the battery 12.

More particularly, in the illustrated embodiment, when the first charging rate is selected, only the portion of the primary winding X1A between the tap X1AB and the end X1AC of the primary winding X1A is energized with 120 volts of alternating current. When the second charging rate is selected, the entire primary winding X1A, between the ends X1AA and X1AC, is selectively energized with 120 volts of alternating current.

The charger 10 further includes means for severing (i.e., zero current, no trickle current) the supply of charging current from the transformer X1 to the battery 12 when the second charging rate is selected and when the sensing means senses battery voltage and for resuming the supply of current to the battery at the second charging rate when the severing means senses battery voltage below the second predetermined threshold voltage.

Although one skilled in the art will readily realize that alternative embodiments are possible, the sensing means and the severing means of the illustrated embodiment are used exclusively when the second charging rate has been selected.

In the illustrated embodiment, the severing means includes a relay K1 having contacts 20 and 22 operative to open to sever current flow through the primary winding of the transformer to sever the supply of charging current to the battery when the sensing means senses battery voltage in excess of the first predetermined threshold voltage. In the illustrated embodiment, the relay K1 is rated for 10 amps through and 120 volts AC across the contacts 20 and 22. The relay K1 further includes a coil 24. Application of 12 volts across the coil 24 results in the closing of the contacts 20 and 22. The contacts 20 and 22 open when the coil 24 is not energized (i.e. when no voltage is applied across the coil 24). The coil 24 has a first end 26 connected to the cathode of diode D2, and a second end 28. The contact 20 is connected to the end X1AA of the primary winding X1A.

The severing means further includes a correct transistor Q1 having an emitter connected to the voltage regulating means. More particularly, the emitter of the transistor Q1 is connected to the +8 volts output of the regulating means. The transistor Q1 also has a base connected to the output, pin 1, of the comparator IC1A, via resistor R4. The severing means further includes a resistor R5 connected between the emitter and the base of the transistor Q1, as well as a resistor R3 connected between the emitter of the transistor Q1 and the output pin 1, of the comparator IC1A.

The severing means further includes a npn transistor Q2 having an emitter connected to ground, a collector, and a base. The severing means further includes a resistor R11 connected between the base and the emitter of the transistor Q2, and a resistor R10 connected between the collector of transistor Q1 and the base of transistor Q2. The severing means further includes a resistor R12 connected between the collector of the transistor Q2 and the end 28 of the coil 24. The severing means further includes a diode D5 having a anode connected to the end 28 of the coil 24, and a cathode connected to the end 26 of the coil 24.

In operation, when the voltage of the battery 12 is less than or equal to the threshold voltage set by the potentiometer P1, then the output, pin 7, of IC1B is pulled down to zero volts. This pulls the non-inverting input, pin 3, of the comparator IC1A low through the switching diode D3, and causes the voltage at the output, pin 1, of the comparator IC1A to be pulled down to zero volts. This turns on the pnp transistor Q1 which turns on the npn transistor Q2, thereby resulting in the coil 24 of the relay K1 being energized. When the battery becomes charged, the output, pin 7 of the comparator IC1B will go to +8 VDC, causing the switching diode D3 to be back-biased. This causes the voltage at the non-inverting input, pin 3, of the comparator IC1A to be governed by the voltage across the electrolytic capacitor C1 through the input resistor R7. When the voltage of the battery 2 reaches the threshold voltage set by the potentiometer P2, the output, pin 1 of the comparator IC1A will become +8 VDC. This turns off the transistors Q1 and Q2, de-energizing the relay K1 and thus disconnecting the 120 VAC source from the primary X1A of the transformer X1 of the charger. The sensing means, regulating means, and severing means are powered by the battery 12 when the charger 10 is off (i.e. 120 VAC is not applied to the primary of the charging transformer), and are powered by the charger when the charger is on.

The battery charger 10 further includes means for alternatively selecting the first charging rate and the second charging rate.

The battery charger 10 includes lines 50 and 52 adapted to be connected to a hot and a neutral line, respectively, of the source of household 120 volt alternating current. In the preferred embodiment, the lines 50 and 52 terminate in a 3-pronged connector for connection to the hot and neutral lines. The 3-pronged connector preferably has a ground pin connected in a conventional fashion to a cabinet (not shown) housing the battery charger 10. The line 50 is connected to an end X1AC of the transformer primary winding X1A.

The means for selecting the first charging rate and the second charging rate comprises a switch SW manually movable (by the user of the battery charger) between a position 62 (high or fast charge mode) and a position 64 (automatic mode) to connect the lead 52 to the tap X1AB or to the contact 22, respectively. When the switch SW is moved to the position 62, 120 volts of alternating current is provided to the transformer primary between the tap X1AB and the end X1AC. When the switch SW is moved to the position 64, 120 volts of alternating current is provided to the transformer primary between the ends X1AA and X1AC, when the contacts 20 and 22 are closed.

Thus, means are provided for alternatively selecting the first charging rate and the second charging rate.

In the preferred embodiment, the switch SW is further manually movable to an "off" position 60 to disconnect the lead 52 from the transformer primary X1A.

The battery charger 10 further includes first, second, and third discrete visual indicators, means for illuminating the first indicator in response to the battery charger being connected to the source of alternating current, means for illuminating the second indicator while the supplying means supplies charging current to the battery at the second current rate, and means for illuminating the third indicator in response to the severing means severing the supply of charging current to the battery while the second (i.e. automatic) charging rate has been selected. The third indicator, when illuminated by the third mentioned illuminating means, thereby provides a visual indication that the second charging rate (i.e. automatic mode) has been selected, and that the current supplying means will resume the supply of charging current to the battery when the sensing means senses battery voltage below the second predetermined voltage. More particularly, in the illustrated embodiment, the first visual indicator is a red neon light, NE1, connected in the battery charger 10 between the leads 50 and 52, the second visual indicator is an amber neon light NE2, connected across the primary winding X1A of the transformer X1, between the ends X1AA and X1AC, and the third visual indicator is a green neon light NE3 having one end connected to the contact 20 and another end connected to the contact 22. Thus, by way of electrical connections in the battery charger 10, means are provided for illuminating the first indicator in response to the battery charger being connected to the source of alternating current, for illuminating the second indicator while the supplying means supplies charging current to the battery at the second current rate, and for illuminating the third indicator in response to the severing means severing the supply of charging current to the battery while the second (i.e. automatic) charging rate has been selected. The third indicator, when illuminated by the third mentioned illuminating means, thereby provides the visual indication that the second charging rate (i.e. automatic mode) has been selected, and that the current supplying means will resume the supply of charging current to the battery when the sensing means senses battery voltage below the second predetermined voltage. The red, amber, and green neon indicators are preferably arranged vertically or horizontally in traffic light order.

The battery charger 10 of the preferred embodiment of the invention includes a fan 70 connected between the tap X1AB of the transformer primary and the lead 50, and operative to cool the battery charger 10 when the means for selectively and alternatively connecting the first and second charging means to the battery 12 connects the first charging means to the battery 12.

Figure 2:
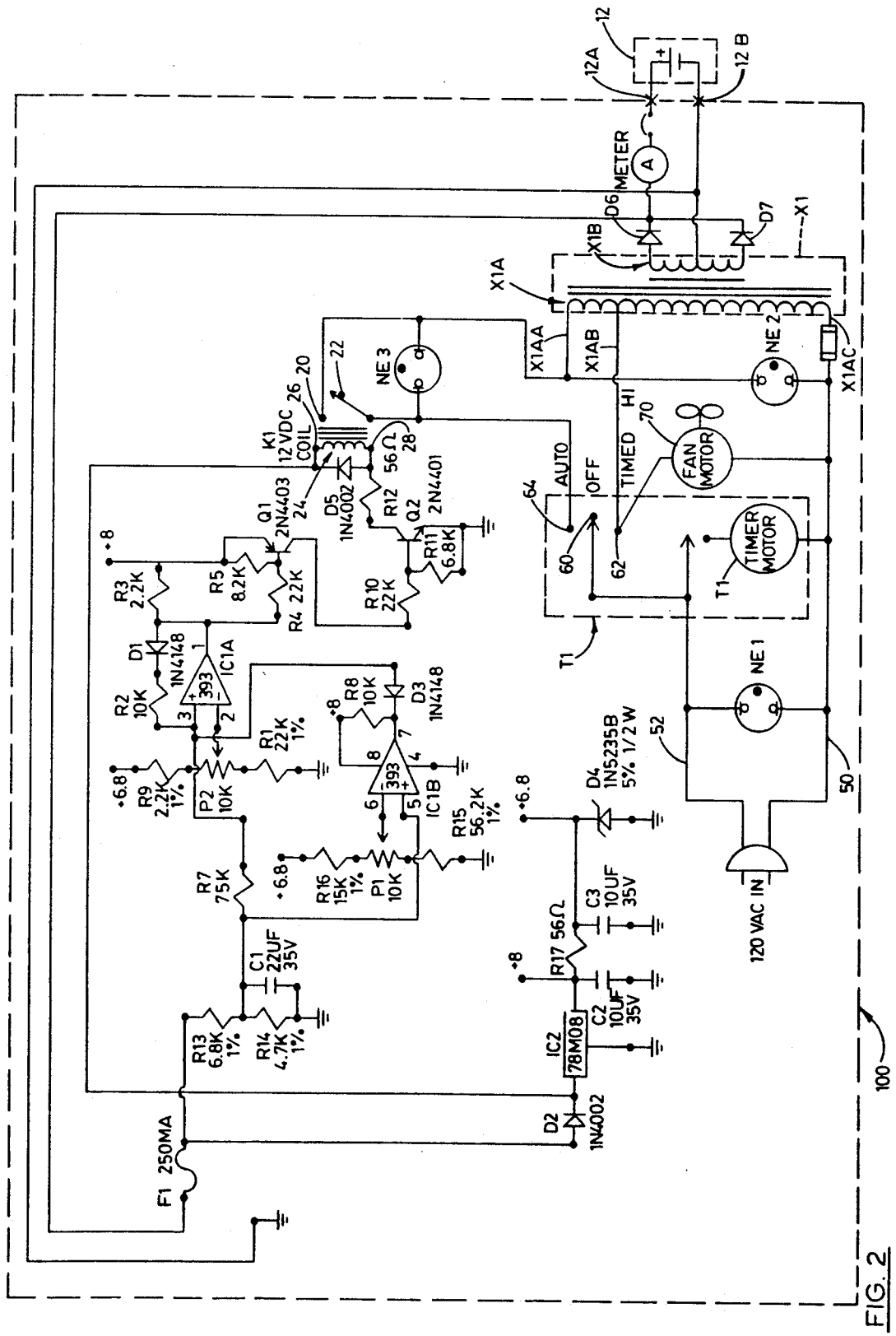
FIG. 2 shows a circuit schematic of an alternate embodiment of the invention.

Shown in FIG. 2 is an alternative embodiment of the invention, a portion of which is identical to the embodiment shown in FIG. 1, like reference numerals indicating like components, which portion will not again be described in detail.

In the alternative embodiment of the invention shown in FIG. 2, the means for alternatively selecting the first charging rate and the second charging rate comprises timer means, including a timer motor, for selecting the first rate for a selected period of time and for selecting the second rate after the selected period of time expires. More particularly, in the illustrated embodiment, the timer means comprises a timer T1 operative to connect the lead 52 to the tap X1AB (fast charge mode) for a period of time selected by the user of the battery charger 10, and to thereafter connect the lead 52 to the contact 22 (automatic mode). The timer T1 can also be operated by the user of the battery charger 10 to connect the second charging means to the battery without the first current supplying means first being connected to the battery 12. An appropriate timer T1 is an electromechanical timer such as Model CX 43706 by Mallory Timers, Valparaiso, Ind.; or Model MS 65 by Corpono and Pons (division of Eaton Controls Products), 76530 Grand-Couronne, France.

Various of the features of the invention are set forth in the following claims.

We claim:

1. A battery charger adapted to be electrically connected to the terminals of a battery for providing a charge to the battery, the battery charger comprising:
    means for supplying charging current to the battery, the current supplying means being operable to alternatively and selectively supply current at a first and second rate, the first rate providing for high rate charging of the battery;
    means for sensing the voltage of the battery while the charger is connected to the battery, the sensing means being adapted to be coupled to the battery;
    means for alternatively selecting the first rate and the second rate, the selecting means being coupled to the supplying means;
    means for severing the supply of charging current to the battery when the second rate is selected and when the sensing means senses battery voltage in excess of a first predetermined threshold voltage, and for resuming the supply of current to the battery at the second rate when the sensing means senses battery voltage below a second predetermined threshold voltage lower than the first predetermined threshold voltage, the severing means being coupled to the current supplying means, to the sensing means, and to the selecting means;
    means for adjusting the first predetermined threshold voltage, and adjusting means comprising a continuously variable selector; and
    means for adjusting the second predetermined threshold voltage.

2. A battery charger as set forth in claim 1 wherein the second current rate is at least 14 amps.

3. A battery charger as set forth in claim 1 wherein the first current rate is at least 30 amps.

4. A battery charger as set forth in claim 1 wherein the first current rate is approximately 40 amps.

5. A battery charger as set forth in claim 1 wherein the means for adjusting the second predetermined threshold voltage comprises a continuously variable selector.

6. A battery charger as set forth in claim 1 wherein the first predetermined threshold voltage is greater than 13.6 volts and the second predetermined threshold voltage is less than 13.6 volts.

7. A battery charger as set forth in claim 1 wherein the first predetermined threshold voltage is approximately 14.4 volts and the second predetermined threshold voltage is approximately 12.8 volts.

8. A battery charger as set forth in claim 1, further adapted to be connected to a source of household alternating current and further including first, second, and third discrete visual indicators, means for illuminating the first indicator in response to the battery charger being connected to the source of alternating current, means for illuminating the second indicator while the current supplying means supplies charging current to the battery at the second current rate, and means for illuminating the third indicator in response to the severing means severing the supply of charging current to the battery while the second charging rate has been selected.

9. A battery charger adapted to be electrically connected to the terminals of a battery for providing a charge to the battery, the battery charger comprising:
    means for supplying charging current to the battery, the current supplying means being operable to alternatively and selectively supply current at a first and second rate, the first rate providing for high rate charging of the battery;
    means for sensing the voltage of the battery while the charger is connected to the battery, the sensing means being adapted to be coupled to the battery;
    means for alternatively selecting the first rate and the second rate, the selecting means including mechanically operable switch means including means for selecting the first current rate and the second current rate, and the selecting means being coupled to the supplying means;
    means for severing the supply of charging current of the battery when the second rate is selected and when the sensing means senses battery voltage in excess of a first predetermined threshold voltage, and for resuming the supply of current to the battery at the second rate when the sensing means senses battery voltage below a second predetermined threshold voltage lower than the first predetermined threshold voltage, the severing means being coupled to the current supplying means, to the sensing means, and to the selecting means.

10. A battery charger adapted to be electrically connected to the terminals of a battery for providing a charge to the battery, the battery charger comprising:
    means for supplying charging current to the battery, the current supplying means being operable to alternatively and selectively supply current at a first and second rate, the first rate providing for high rate charging of the battery, the current supplying means including a transformer having a primary winding adapted to be electrically connected to household alternating current, and a secondary winding adapted to be electrically connected to the battery;

means for sensing the voltage of the battery while the charger is connected to the battery, the sensing means being adapted to be coupled to the battery;

means for alternatively selecting the first rate and the second rate, the selecting means being coupled to the supplying means;

means for severing the supply of charging current of the battery when the second rate is selected and when the sensing means senses battery voltage in excess of a first predetermined threshold voltage, and for resuming the supply of current to the battery at the second rate when the sensing means senses battery voltage below a second predetermined threshold voltage lower than the first predetermined threshold voltage, the severing means being coupled to the current supplying means, to the sensing means, and to the selecting means, the severing means including relay contacts operative to open to sever current flow through the primary winding of the transformer to sever the supply of charging current to the battery when the sensing means senses battery voltage in excess of the upper predetermined threshold voltage.

11. A battery charger adapted to be electrically connected to the terminals of a battery for providing a charge to the battery, the battery charger comprising:

means for supplying a charging current to the battery, the current supplying means being operable to alternatively and selectively supply current at a first and second rate, the first current rate being at least 30 amps and providing for high rate charging of the battery;

means for sensing the voltage of the battery when the charger is connected to the battery, the sensing means being adapted to be coupled to the battery;

timer means for selecting the first rate for a selected period of time, and for selecting the second rate after the selected period of time expires, the timer means being coupled to the supplying means; and means for severing the supply of charging current to the battery when the second rate is selected and when the sensing means senses battery voltage in excess of a first predetermined threshold voltage, and for resuming the supply of charging current to the battery at the second rate when the sensing means senses battery voltage below a second predetermined threshold voltage lower than the first predetermined threshold voltage, the severing means being coupled to the current supplying means, to the sensing means, and to the timer means.

12. A battery charger as set forth in claim 13 wherein the second current rate is at least 14 amps.

13. A battery charger as set forth in claim 11 wherein the first current rate is at least 30 amps.

14. A battery charger as set forth in claim 11 wherein the first current rate is approximately 40 amps.

15. A battery charger as set forth in claim 11 and further comprising means for adjusting the first predetermined threshold voltage, the adjusting means comprising a continuously variable selector.

16. A battery charger as set forth in claim 11 and further comprising means for adjusting the second predetermined threshold voltage.

17. A battery charger as set forth in claim 16 wherein the means for adjusting the second predetermined threshold voltage comprises a continuously variable selector.

18. A battery charger as set forth in claim 11 wherein the first predetermined threshold voltage is greater than 13.6 volts and the second predetermined threshold voltage is less than 13.6 volts.

19. A battery charger as set forth in claim 11 wherein the first predetermined threshold voltage is approximately 14.4 volts and the second predetermined threshold voltage is approximately 12.8 volts.

20. A battery charger as set forth in claim 11, further adapted to be connected to a source of household alternating current, and further including first, second, and third discrete visual indicators, means for illuminating the first indicator in response to the battery charger being connected to the source of alternating current, means for illuminating the second indicator while the supplying means supplies charging current to the battery at the second current rate, and means for illuminating the third indicator in response to the severing means severing the supply of charging current to the battery while the second charging rate has been selected.

21. A battery charger as set forth in claim 11 wherein the current supplying means comprises a transformer having a primary winding adapted to be electrically connected to household alternating current, and a secondary winding adapted to be electrically connected to the battery, wherein the severing means includes relay contacts operative to open to sever current flow through the primary winding of the transformer to sever the supply of charging current to the battery when the sensing means senses battery voltage in excess of the upper predetermined threshold voltage.

22. A battery charger comprising:

means for sensing the voltage of a battery when a battery is electrically connected to the charger;

means for supplying at least 14 amps of charging current to the battery;

means for severing the supply of charging current to the battery when the sensing means senses battery voltage in excess of a first predetermined threshold voltage and for resuming the supply of at least 14 amps of charging current to the battery when the sensing means sense battery voltage below a second predetermined threshold voltage lower than the first predetermined threshold voltage, the severing means being coupled to the current supplying means and to the sensing means.

23. A battery charger as set forth in claim 22, said sensing means further comprising means for adjusting the first threshold voltage, the adjusting means comprising a continuously variable selector.

24. A battery charger as set forth in claim 22, said sensing means further comprising means for adjusting the second predetermined threshold voltage.

25. A battery charger as set forth in claim 24 wherein the means for adjusting the second predetermined threshold voltage comprises a continuously variable selector.

26. A battery charger as set forth in claim 22 wherein the first predetermined threshold voltage is greater than 13.6 volts and the second predetermined threshold voltage is lower than 13.6 volts.

27. A battery charger as set forth in claim 22 wherein the first predetermined threshold voltage is approximately 14.4 volts and the lower predetermined threshold voltage is approximately 12.8 volts.

28. A battery charger as set forth in claim 22 further adapted to be connected to a source of household alternating current and further including first, second and third discrete visual indicators, means for illuminating the first indicator in response to the battery charger being connected to the source of alternating current, means for illuminating the second indicator while the supplying means supplies charging current to the battery, and means for illuminating the third indicator in response to the severing means severing the supply of charging current to the battery while the second charging rate has been selected.

29. A battery charger as set forth in claim 22 wherein the current supplying means comprises a transformer having a primary winding adapted to be electrically connected to household alternating current, and a secondary winding adapted to be electrically connected to the battery, wherein the severing means includes relay contacts operative to open to sever current flow through the primary winding of the transformer to sever the supply of charging current to the battery when the sensing means senses battery voltage in excess of the first predetermined threshold voltage.

30. A method of charging a battery comprising the steps of:
providing means for supplying charging current to the battery, the current supplying means being operable to alteratively supply current at a first rate and at a second rate;
selecting one of the first rate and the second rate;
electronically severing the supply of charging current to the battery when the second rate is selected and when the battery voltage exceeds a first predetermined threshold voltage;
electronically resuming the supply of current to the battery at the second rate when the battery voltage falls below a second predetermined threshold voltage lower than the first predetermined threshold voltage; and
adjusting the second predetermined threshold voltage after said providing step.

31. A method in accordance with claim 30 wherein the second current rate is at least 14 amps.

32. A method in accordance with claim 30 wherein the first current rate is at least 30 amps.

33. A method in accordance with claim 30 and further including the step of adjusting the first predetermined threshold voltage.

34. A method in accordance with claim 30 wherein the first predetermined threshold voltage is greater than 13.6 volts and the second predetermined threshold voltage is less than 13.6 volts.

35. A method in accordance with claim 30 wherein the first predetermined threshold voltage is approximately 14.4 volts and the second predetermined threshold voltage is approximately 12.8 volts.

36. A method in accordance with claim 30 and further including the steps of illuminating a visual indicator when current is supplied at the second rate, and illuminating a visual indicator when the supply of charging current has been severed while the second current rate has been selected.

37. A method of charging a battery comprising the steps of:
providing means for supplying charging current to the battery, the current supplying means being operable to selectively supply current at a first rate of at least 30 amps and at a second rate;
selecting the first rate for a selected period of time and thereafter selecting the second rate;
electronically severing the supply of charging current to the battery when the second rate is selected and when the battery voltage exceeds a first predetermined threshold voltage; and
electronically resuming the supply of current to the battery at the second rate when the battery voltage falls below a second predetermined threshold voltage lower than the first predetermined threshold voltage.

38. A method in accordance with claim 37 wherein the second current rate is at least 14 amps.

39. A method in accordance with claim 37 wherein the first current rate is at least 30 amps.

40. A method in accordance with claim 37 and further including the step of adjusting the first predetermined threshold voltage.

41. A method in accordance with claim 37 and further including the step of adjusting the second predetermined threshold voltage.

42. A method in accordance with claim 37 wherein the first predetermined threshold voltage is greater than 13.6 volts and the second predetermined threshold voltage is less than 13.6 volts.

43. A method in accordance with claim 37 wherein the first predetermined threshold voltage is approximately 14.4 volts and the second predetermined threshold voltage is approximately 12.8 volts.

44. A method in accordance with claim 37 and further including the steps of illuminating a visual indicator when current is supplied at the second rate, and illuminating a visual indicator when the supply of charging current has been severed while the second current rate has been selected.

45. A method of charging a battery comprising the steps of:
providing means for supplying at least 14 amps of charging current to the battery;
electronically severing the supply of charging current to the battery when the battery voltage exceeds a first predetermined threshold voltage; and
electronically resuming the supply of current to the battery when the battery voltage falls below a second predetermined threshold voltage lower than the first predetermined threshold voltage.

46. A method in accordance with claim 45 further including the step of adjusting the first predetermined threshold voltage.

47. A method in accordance with claim 45 and further including the step of adjusting the second predetermined threshold voltage.

48. A method in accordance with claim 45 wherein the first predetermined threshold voltage is greater than 13.6 volts and the second predetermined threshold voltage is less than 13.6 volts.

49. A method in accordance with claim 45 wherein the first predetermined threshold voltage is approximately 14.4 volts and the second predetermined threshold voltage is approximately 12.8 volts.

50. A method in accordance with claim 45 and further including the steps of illuminating a visual indicator when the supply of charging current at the second rate is severed.

* * * * *

UNITED STATES PATENT AND TRADEMARK OFFICE
CERTIFICATE OF CORRECTION

PATENT NO. : 5,168,205
DATED : December 1, 1992
INVENTOR(S) : John T.C. Kan, et al.

It is certified that error appears in the above-identified patent and that said Letters Patent is hereby corrected as shown below:

Column 7, line 47, "battery 2" should read --battery 12--.

Column 9, Claim 1, line 59, "and" should read --the--.

Column 10, Claim 9, line 44, "current of the battery" should read --current to the battery--.

Column 11, Claim 10, line 7, "current of the battery" should read --current to the battery--.

Column 11, Claim 12, line 52 "claim 13" should read --claim 11--.

Column 13, Claim 30, line 25, "alteratively" should be spelled --alternatively--.

Signed and Sealed this

Second Day of November, 1993

Attest:

BRUCE LEHMAN

*Attesting Officer*   *Commissioner of Patents and Trademarks*